US010565838B2

(12) United States Patent
Horgan et al.

(10) Patent No.: US 10,565,838 B2
(45) Date of Patent: Feb. 18, 2020

(54) BUILDING ACCESS CONTROL SYSTEM WITH COMPLEX EVENT PROCESSING

(71) Applicant: Johnson Controls Technology Company, Auburn Hills, MI (US)

(72) Inventors: Donagh S Horgan, Cork (IE); Jan R Holliday, Maryville, IL (US); Eamonn O'Toole, Cork (IE)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/269,472

(22) Filed: Feb. 6, 2019

(65) Prior Publication Data

US 2019/0244450 A1 Aug. 8, 2019

Related U.S. Application Data

(60) Provisional application No. 62/628,164, filed on Feb. 8, 2018, provisional application No. 62/627,677, filed
(Continued)

(51) Int. Cl.
*G08B 13/00* (2006.01)
*G08B 13/08* (2006.01)
(Continued)

(52) U.S. Cl.
CPC ............. *G08B 13/08* (2013.01); *G06N 20/00* (2019.01); *G07C 9/00103* (2013.01);
(Continued)

(58) Field of Classification Search
CPC ............................ G08B 13/08; G07C 9/00103
(Continued)

(56) References Cited

U.S. PATENT DOCUMENTS

| 7,467,400 | B1 * | 12/2008 | Moss ................. G07C 9/00166 |
| | | | 713/150 |
| 9,652,813 | B2 | 5/2017 | Gifford et al. |
| 10,051,349 | B2 * | 8/2018 | Schattmaier .......... G08B 31/00 |
| 2007/0273497 | A1 | 11/2007 | Kuroda et al. |
| 2009/0051528 | A1 | 2/2009 | Graichen |
| 2011/0077950 | A1 | 3/2011 | Hughston |

(Continued)

FOREIGN PATENT DOCUMENTS

| CN | 106204392 A | 12/2016 |
| CN | 106960269 A | 7/2017 |

(Continued)

OTHER PUBLICATIONS

International Search Report and Written Opinion for International Application no. PCT/US2019/016919, dated May 17, 2019, 18 pages.

*Primary Examiner* — Tai T Nguyen
(74) *Attorney, Agent, or Firm* — Foley & Lardner LLP

(57) ABSTRACT

A method for controlling access to at least a portion of a building includes providing a temporal model identifying relationships between a first set of access control events based on times at which the first set of access control events occurred, providing a spatial model identifying relationships between a second set of access control events based on locations associated with the second set of access control events, providing a user model identifying patterns of user behavior based on a third set of access control events, receiving a fourth set of access control events comprising time data, and location data, and user data associated with the access control events, and determining whether to generate alarms responsive to receiving the fourth set of access control events using the temporal model, the spatial model, and the user model.

26 Claims, 5 Drawing Sheets

Related U.S. Application Data on Feb. 7, 2018, provisional application No. 62/627,696, filed on Feb. 7, 2018.

(51) Int. Cl.
| | |
|---|---|
| *G07C 9/00* | (2020.01) |
| *G08B 25/00* | (2006.01) |
| *G08B 29/18* | (2006.01) |
| *G08B 29/16* | (2006.01) |
| *G06N 20/00* | (2019.01) |
| *G08B 13/04* | (2006.01) |

(52) U.S. Cl.
CPC ........... *G08B 13/04* (2013.01); *G08B 25/001* (2013.01); *G08B 29/16* (2013.01); *G08B 29/185* (2013.01)

(58) Field of Classification Search
USPC ............... 340/541, 540, 521, 545.1; 713/150
See application file for complete search history.

(56) References Cited

U.S. PATENT DOCUMENTS

| | | |
|---|---|---|
| 2013/0307682 A1* | 11/2013 | Jerhotova ........... G06F 17/2785 340/521 |
| 2014/0327555 A1 | 11/2014 | Sager et al. |
| 2016/0379326 A1 | 12/2016 | Chan-Gove et al. |
| 2017/0084168 A1 | 3/2017 | Janchookiat |
| 2017/0278003 A1 | 9/2017 | Liu |
| 2017/0323389 A1 | 11/2017 | Vavrasek |
| 2017/0345287 A1 | 11/2017 | Fuller et al. |
| 2017/0357908 A1 | 12/2017 | Cabadi et al. |
| 2018/0012159 A1 | 1/2018 | Kozloski et al. |

FOREIGN PATENT DOCUMENTS

| | | |
|---|---|---|
| CN | 107147639 A1 | 9/2017 |
| JP | 2008-107930 A | 5/2008 |
| KR | 2016/0102923 A | 8/2016 |
| WO | WO-2017/192422 A1 | 11/2017 |

* cited by examiner

BUILDING ACCESS CONTROL SYSTEM WITH COMPLEX EVENT PROCESSING

CROSS-REFERENCE TO RELATED PATENT APPLICATION

This application claims the benefit of and priority to U.S. Provisional Patent Application No. 62/627,696 filed Feb. 7, 2018, U.S. Provisional Patent Application No. 62/627,677 filed Feb. 7, 2018, and U.S. Provisional Patent Application No. 62/628,164 filed Feb. 8, 2018, the entire disclosures each of which is incorporated by reference herein.

BACKGROUND

The present disclosure relates generally to the field of building access control systems (ACS). Access control systems can restrict access to various locations or resources associated with a building or building campus. For example, access control systems may include card readers configured to open a locked door in response to receiving a signal from an identification card. Access control systems may generally include a centralized security operations center (SOC) such that a security staff can monitor a building and respond to potential security threats.

Access control devices such as card readers, biometric readers, and cameras can be configured to generate access control events. These events may include access granted events and door held open events, for example. Previous access control systems have lacked the intelligence needed to discover patterns and prioritize events that require immediate attention of security personnel. As a result, security personnel are often required to respond to nuisance alerts. This phenomenon creates various inefficiencies related to building security management.

SUMMARY

One implementation of the present disclosure is a method for controlling access to at least a portion of a building. The method includes providing a temporal model identifying relationships between a first set of access control events based on times at which the first set of access control events occurred, providing a spatial model identifying relationships between a second set of access control events based on locations associated with the second set of access control events, providing a user model identifying patterns of user behavior based on a third set of access control events, receiving a fourth set of access control events including time data, and location data, and user data associated with the access control events, and determining whether to generate alarms responsive to receiving the fourth set of access control events using the temporal model, the spatial model, and the user model.

In some embodiments, the plurality of access control events is received from a plurality of access control devices including at least one of a card reader, a keypad reader, a biometric reader, a motion detector, or a camera.

In some embodiments, the first, second, and third sets of access control events are received from the plurality of access control devices, such that the temporal model, the spatial model, and the user model are trained on data from the same access control devices from which the access control events are received.

In some embodiments, at least one of the first, second, or third set of access control events is a same access control event as at least another of the first, second, or third set of access control events.

In some embodiments, determining whether to generate alarms includes generating an alarm for a first access control event of the plurality of access control events responsive to any of the temporal model, the spatial model, and the user model indicating an alarm should be raised.

In some embodiments, the temporal model is an occupancy model estimating an occupancy level of the at least a portion of the building, and determining whether to generate alarms includes generating an alarm based on a first access control event of the fourth set of access control events responsive to the temporal model indicating the at least a portion of the building is unoccupied.

In some embodiments, the temporal model is an event rate model indicating a time relationship between alert events for one or more access control devices, and determining whether to generate alarms includes suppressing an alarm based on a first access control event responsive to the first access control event being associated with a first access control device of the one or more access control devices and the event rate model indicating a fault with the first access control device based on a time relationship between alert events for a plurality of access control events of the first set of access control events associated with the first access control device.

In some embodiments, the spatial model is a connectivity model indicative of spatial relationships between a plurality of access control devices in the building determined based on time data and location data of the second set of access control events, and determining whether to generate alarms includes, for a first subset of access control events of the fourth set of access control events, generating an alarm responsive to the connectivity model determining the time data and location data of the first subset of access control events indicates an abnormal pattern of movement.

In some embodiments, the spatial model further includes floorplan information used to supplement data from the connectivity model.

In some embodiments, the user model is an access device type model identifying patterns of behavior in the manner in which access devices of a plurality of access device types are used based on the type of access device, and determining whether to generate alarms includes, for a first subset of access control events of the fourth set of access control events, generating an alarm responsive to the access device type model indicating a pattern of behavior exhibited by a first access device of a first access device type associated with the first subset of access control events does not match an expected pattern of behavior for the first access device type.

In some embodiments, the first access device type is a temporary access device, and the access device type model indicates that the pattern of behavior exhibited by the first access device does not match an expected pattern of behavior for a temporary access device.

In some embodiments, the user model is configured to determine a home building associated with a first user based on the third set of access control events, and determining whether to generate alarms includes determining to generate an alarm based on a first access control event of the fourth set of access control events responsive to determining the building is not the home building, the first access control event associated with the first user.

In some embodiments, the user model is a user-specific model configured to determine a normal pattern of behavior for a particular user based on the third set of access control events, and wherein determining whether to generate alarms includes determining to generate an alarm based on a first subset of access control events of the fourth set of access control events responsive to the user-specific model indicating a pattern of behavior of the particular user reflected in the first subset of access control events does not match the normal pattern of behavior.

Another implementation of the present disclosure is a system for controlling access to at least a portion of a building. The system includes one or more processors and one or more computer-readable storage media having instructions stored thereon that, when executed by the one or more processors, cause the one or more processors to implement operations. The operations include providing a temporal model identifying relationships between a first set of access control events based on times at which the first set of access control events occurred, providing a spatial model identifying relationships between a second set of access control events based on locations associated with the second set of access control events, providing a user model identifying patterns of user behavior based on a third set of access control events, receiving a fourth set of access control events including time data, and location data, and user data associated with the access control events, and determining whether to generate alarms responsive to receiving the fourth set of access control events using the temporal model, the spatial model, and the user model.

In some embodiments, the plurality of access control events are received from a plurality of access control devices including at least one of a card reader, a keypad reader, a biometric reader, a motion detector, or a camera.

In some embodiments, the first, second, and third sets of access control events are received from the plurality of access control devices, such that the temporal model, the spatial model, and the user model are trained on data from the same access control devices from which the access control events are received.

In some embodiments, at least one of the first, second, or third set of access control events is a same access control event as at least another of the first, second, or third set of access control events.

In some embodiments, determining whether to generate alarms includes generating an alarm for a first access control event of the plurality of access control events responsive to any of the temporal model, the spatial model, and the user model indicating an alarm should be raised.

In some embodiments, the temporal model is an occupancy model estimating an occupancy level of the at least a portion of the building, and determining whether to generate alarms includes generating an alarm based on a first access control event of the fourth set of access control events responsive to the temporal model indicating the at least a portion of the building is unoccupied.

In some embodiments, the temporal model is an event rate model indicating a time relationship between alert events for one or more access control devices, and determining whether to generate alarms includes suppressing an alarm based on a first access control event responsive to the first access control event being associated with a first access control device of the one or more access control devices and the event rate model indicating a fault with the first access control device based on a time relationship between alert events for a plurality of access control events of the first set of access control events associated with the first access control device.

In some embodiments, the spatial model is a connectivity model indicative of spatial relationships between a plurality of access control devices in the building determined based on time data and location data of the second set of access control events, and determining whether to generate alarms includes, for a first subset of access control events of the fourth set of access control events, generating an alarm responsive to the connectivity model determining the time data and location data of the first subset of access control events indicates an abnormal pattern of movement.

In some embodiments, the spatial model further includes floorplan information used to supplement data from the connectivity model.

In some embodiments, the user model includes an access device type model identifying patterns of behavior in the manner in which access devices of a plurality of access device types are used based on the type of access device, and determining whether to generate alarms includes, for a first subset of access control events of the fourth set of access control events, generating an alarm responsive to the access device type model indicating a pattern of behavior exhibited by a first access device of a first access device type associated with the first subset of access control events does not match an expected pattern of behavior for the first access device type.

In some embodiments, the first access device type is a temporary access device, and the access device type model indicates that the pattern of behavior exhibited by the first access device does not match an expected pattern of behavior for a temporary access device.

In some embodiments, the user model is configured to determine a home building associated with a first user based on the third set of access control events, and determining whether to generate alarms includes determining to generate an alarm based on a first access control event of the fourth set of access control events responsive to determining the building is not the home building, the first access control event associated with the first user.

In some embodiments, the user model is a user-specific model configured to determine a normal pattern of behavior for a particular user based on the third set of access control events, and determining whether to generate alarms includes determining to generate an alarm based on a first subset of access control events of the fourth set of access control events responsive to the user-specific model indicating a pattern of behavior of the particular user reflected in the first subset of access control events does not match the normal pattern of behavior.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, an access control system with complex processing of access control events is shown, according to various embodiments. The access control system is configured to maintain a database of access control event data generated by a plurality of access control devices installed in a building or building campus. The access control devices may include card readers, biometric readers, motion detectors, cameras, fire alarms, burglar alarms, and other types of sensors capable of generating access control event data. The access control events may include door forced open events, door held open events, access granted events, access denied events, glass break events, and other types of events. The access control system includes an event processing engine configured to identify patterns in access control event data for a building or campus in order to automate the process of escalating events that likely indicate a security threat and suppressing events that likely indicate a nuisance. This functionality allows for improved efficiency in building security management.

Building Access Control System

Figure 1:
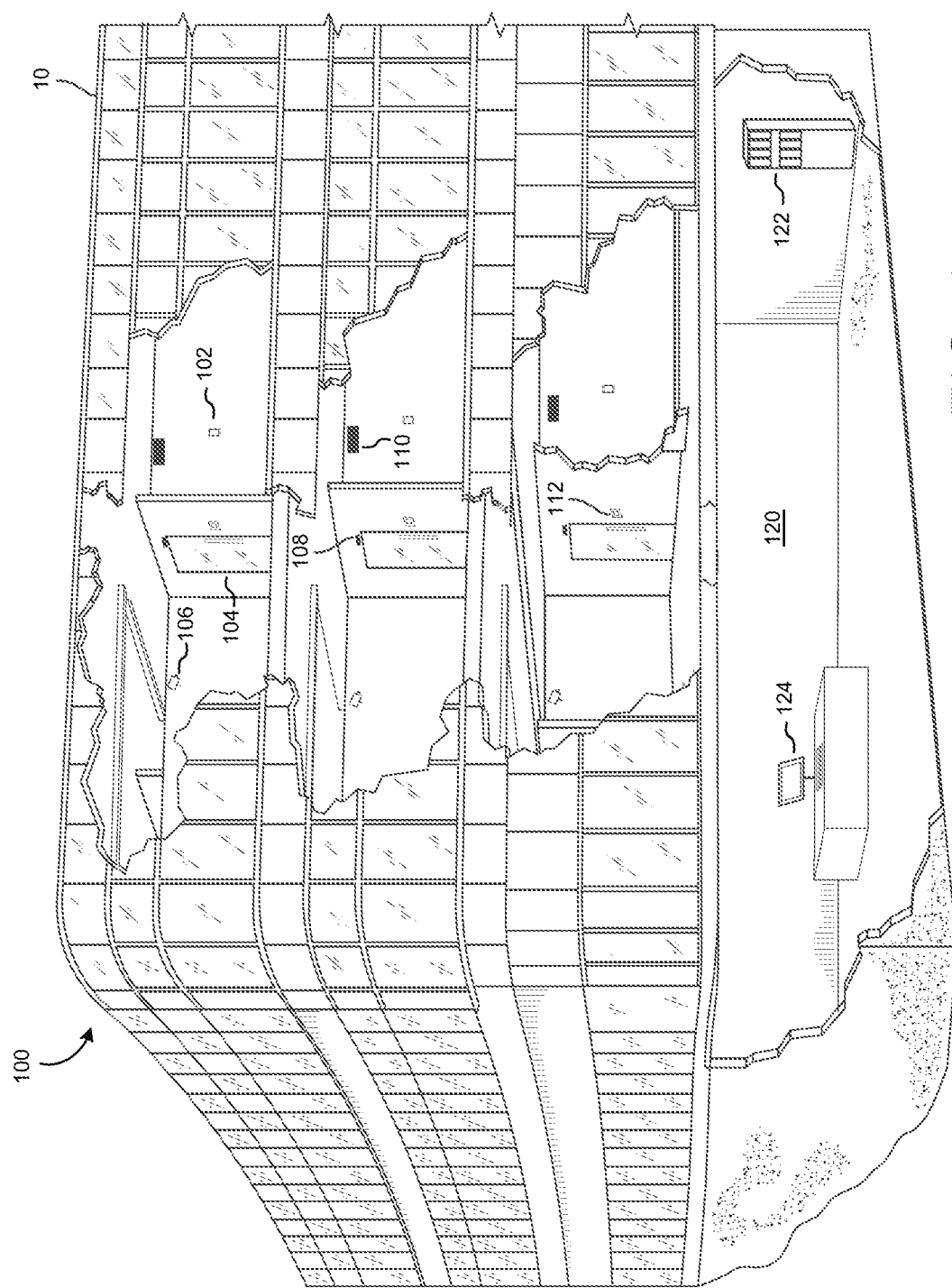
FIG. 1 is a drawing of an access control system installed in a building, according to some embodiments.

Referring to FIG. 1, a drawing of an example access control system 100 installed in a building 10 is shown, according to some embodiments. Access control system 100 is generally configured to restrict access to various resources (e.g., access points) and identify security threats associated with building 10. Access control system 100 can also be configured to perform this functionality for groups of building in disparate locations and/or across large building campuses. For example, access control system 100 can be used to restrict access to doors both internal and external to building 10. Access control system 100 can also be used to restrict access to parking areas, personal storage areas, and other types of places and resources. Access control system 100 includes different access control devices in communication with a security operations center (SOC) 120. Access control system 100 may be integrated with a variety of other building systems such as HVAC systems, lighting systems, fire suppression systems, and the like.

Access control system 100 is shown to include a request to exit device 102, an internal door 104, a camera 106, a door lock 108, a door controller 110, and a card reader 112. Request to exit device 102 may be a push button or other type of device that building occupants interact with to request access to door 104. Camera 106 may be one of a plurality of security cameras associated with access control system 100. Door lock 108 may be a magnetic door lock or other type of door lock configured to restrict access to a door associated with building 10. Card reader 112 may be configured to read magnetic or inductive identification cards that authenticate users within access control system 100. Door controller 110 may be in communication with devices such as camera 106, request to exit device 102, door lock 108, and card reader 112. It will be appreciated that access control system 100 can include a variety of other devices installed in a variety of configurations in addition to the drawing shown in FIG. 1. For example, access control system 100 may include access control devices such as biometric readers (e.g., fingerprint, iris recognition, facial recognition), motion detectors, keypad readers, turnstiles, and other types of sensors.

SOC 120 is shown to include both a server 122 as well as a workstation 124. Each of the access control devices associated with access control system 100 may be in communication with server 122. These connections may be established using a variety of wired and/or wireless communications protocols. In some embodiments, server 122 is not located within building 10 (on-premises) but instead is located in a remote location (cloud-based). Communications with a remote server may be facilitated by network switches or gateways installed in building 10. Access control system 100 may also be implemented using a combination of on-premises and remote servers. Workstation 124 may include a variety of computing devices such as personal computers, laptops, and displays through which security personnel may interact with access control system 100. For example, server 122 can be configured to generate and provide a user interface to security personnel through workstation 124. Security personnel may also interact with access control system 100 using mobile devices such as smartphones and tablets.

SOC 120 may generally be operated by a security staff in order to supervise building 10. SOC 120 can provide a centralized location for security personnel to monitor and respond to potential security threats. For example, SOC 120 may include monitors for viewing video captured by camera 106. Previous access control systems have lacked the intelligence needed to discover patterns and prioritize events that require immediate attention of security personnel. These previous systems have also failed to suppress nuisance alerts such as excessive door forced open events. As a result, operators of SOC 120 may be required to respond to nuisance alerts instead of focusing attention on serious issues. This phenomenon creates various inefficiencies related to building security management.

Event Processing

Figure 2:
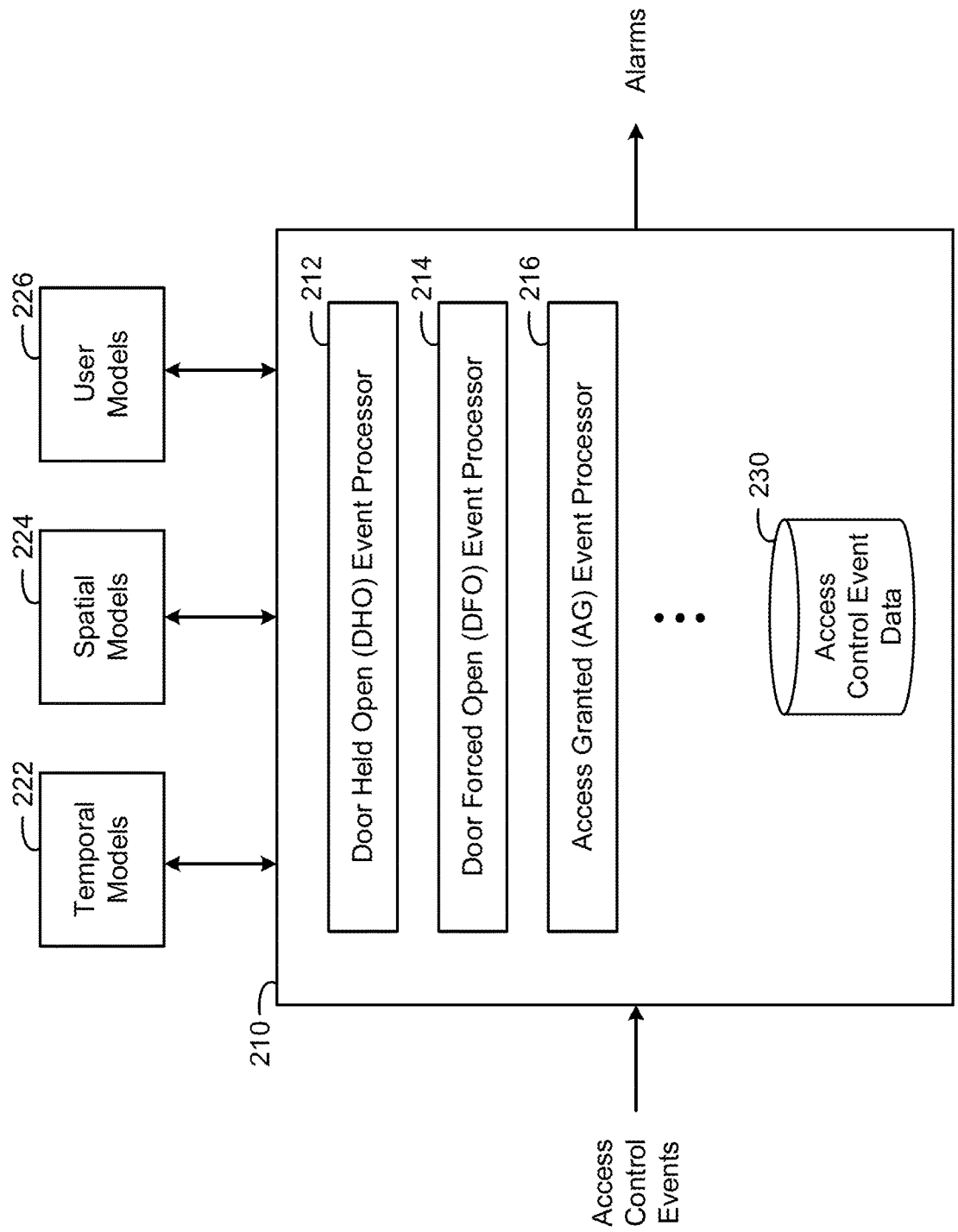
FIG. 2 is a block diagram showing an event processing engine associated with the access control system of FIG. 1, according to some embodiments.

Referring now to FIG. 2, a block diagram of an event processing engine 210 associated with access control system 100 is shown, according to some embodiments. Event processing engine 210 can be configured to receive and process access control events generated by access control devices associated with access control system 100. For example, event processing engine 210 can receive and process events generated by card readers, keypad readers, biometric readers, motion detectors, door controllers, electronic locks, and security cameras among other types of sensors and devices. Event processing engine 210 can be configured to enrich raw data received from such devices to provide additional context (e.g., labels, metadata). This data enrichment facilitates and enables various functions performed by event processing engine 210. Moreover, event processing engine 210 can be configured to maintain an access control event database 230 such that historical information related to access control system 100 can be retrieved for various purposes. In some embodiments, event processing engine 210 is a component of server 122 as described above. In various embodiments, event processing engine 210 can be implemented using one or more processors and one or more computer-readable storage media (e.g., memories) having instructions stored thereon that, when executed by the one or more processors, implement operations providing the various features discussed in detail below.

Event processing engine 210 can be configured to process a variety of different types of access control events. For example, event processing engine 210 can be configured to process access granted (AG) events, door held open (DHO) events, door forced open (DFO) events, access denied (AD) events, communications failure events, glass break events, motion detection events, fire alarm events, burglar alarm events, and duress events among other types of events. Each event received by event processing engine 210 may include a device identifier and a timestamp in addition to other information. For example, an access granted event may include a device identifier (e.g., associated with a card reader), a timestamp, and a user identifier to identify the user that was granted access. A door held open event may be generated if a door remains unlocked or open for longer than a threshold amount of time. The door held open event may similarly include a user identifier, a device identifier, and one or more timestamps.

A door forced open event may be indicative of an intrusion and a security threat posed to building 10. Door forced open events may be generated when a door becomes unlocked, but the unlocking was not performed by access control system 100. Door forced open events may include a device identifier, a device identifier (e.g., door identifier), and a timestamp, for example. Access denied events may include a device identifier, a timestamp, and possibly a user identifier. A user identifier may be included if the user is recognizable such as if a known access card is scanned but the user does not have permission to access the requested space or resource. A user identifier may not be included if an incorrect access code is entered on a keypad reader, for example. Communications failure events may include a timestamp indicating a time when the connection was lost as well as a device identifier indicating the device. Communications failure events may be significant in that the associated device may have been damaged (e.g., by an intruder) or may be malfunctioning (e.g., due to water damage, low battery, loss of power). Duress events may be triggered by occupants of building 10 such as via a smartphone or other type of user device.

As shown in FIG. 2, event processing engine 210 may include a separate software component for processing different event types. For example, event processing engine 210 is shown to include door held open event processor 212, a door forced open event processor 214, and an access granted event processor 216. While not explicitly shown, event processing engine 210 may also include a communications failure event processor and a glass break event processor, among others. This design allows event processing engine 210 to more efficiently and effectively process different types of events. For example, each event processor may be configured to enrich raw event data such as by adding labels or metadata. Event processing engine 210 can be configured to maintain access control event database 230 with enriched access control event data received from access control devices.

A variety of different machine learning models can be built in order to more effectively process and analyze access control event data, in some example embodiments. These models can gain insight into the behavior of access control system 100 as installed in building 10 by evaluating an access control event dataset in order to discover patterns of interest. These patterns may be specific to a certain device or set of devices (e.g., card reader), specific to different spaces within building 10, specific to different users of building 10, specific to different times, and specific to different event types. Three different types of models are depicted in FIG. 2: temporal models 222, spatial models 224, and user models 226. The integration of these models into event processing engine 210 facilitates automation of previously manual procedures. Further, these models allow event processing engine 210 to more effectively diagnose a live stream of access control event data and highlight potential threats to the security of building 10. For example, previous systems have required the manual creation of static rules used to suppress nuisance events and false alarms. However, these static rules are susceptible to error and do not adjust to a dynamically changing security environment associated with building 10. Further, these static rules may only evaluate a single event without any context of separate but related events. The integration of temporal models 222, spatial models 224, and user models 226 facilitate a dynamic access control environment that is tailored to a specific system configuration (e.g., a specific building). In various implementations and/or for various types of access event data items, a single model of models 222, 224, and 226 may be used to process the data or multiple models (e.g., all three models) may be used to process the data.

Temporal models 222 may generally be configured to learn how the behavior of access control system 100 varies with respect to time. For example, temporal models 222 may include a dynamic occupancy model that understands typical usage patterns of building 10. This occupancy model can detect anomalies in ways that a static occupancy model cannot. For example, a static occupancy model may be configured such that a building is considered to be occupied from 6 A.M. until 7 P.M. on weekdays. However, if the building is closed (e.g., for a snow day), this static occupancy model will not automatically adjust based on the live access control event data stream for that day. However, a dynamic model can automatically detect that the building is not occupied and can adjust security policies accordingly. Additionally, temporal model 222 may include general event rate models that measure that rate at which various events are emitted from various access control devices. Abnormal event rates may indicate potential issues related to device health. For example, a door lock fault detection model can be implemented to detect when a fault has occurred (e.g., access granted followed by door forced open). As another example, a door forced open flood detection model can be implemented to detect a fault when an access control device generates an excessive number of door forced open events (e.g., due to water damage or general malfunctioning). Examples of temporal models that can be utilized in conjunction with the features of the present disclosure, in some implementations, can be found in U.S. patent application Ser. No. 16/269,274, titled "BUILDING MANAGEMENT SYSTEM TO DETECT ANOMALOUSNESS WITH TEMPORAL PROFILE," and filed on Feb. 6, 2019 (the same day as the present application), the entire contents of which is incorporated herein by reference.

Spatial models 224 may generally be configured to learn how the behavior of access control system 100 varies with respect to spaces within building 10 such as rooms, zones, and floors. In the case where access control system 100 is implemented in a building campus including multiple buildings, spatial models 224 may also learn how system behavior varies from building to building. Context for these models can be provided by building floorplans and/or can be learned by evaluating data in database 230. For example, a connectivity model can be implemented to create links between spatially related access control devices. Building floorplans may be used in conjunction with spatial models 224 to correlate access control events across space. Examples of spatial models that can be utilized in conjunction with the features of the present disclosure, in some implementations, can be found in U.S. patent application Ser. No. Ser. No. 16/269,384, titled "BUILDING ACCESS CONTROL SYSTEM WITH SPATIAL MODELING," and filed on Feb. 6, 2019 (the same day as the present application), the entire contents of which is incorporated herein by reference.

User models 226 may generally be configured to learn how the behavior of access control system 100 varies with respect to different users. For example, user models can 226 can be configured to generate dynamic badge types such that access control system 100 can make decisions based on how an access badge is used as opposed to simply the static data fields included with the access badge. Users may be separated into distinct groups such as employees and visitors using unsupervised approaches such as clustering. Further, user models 226 can identify a home building for a specific user such that when the user is determined to be outside of this home building the possibility of suspicious behavior is higher. User models 226 may also identify the most common access points associated with individual users such that usual behavior is learned and suspicious behavior can be flagged more easily.

Temporal models 222, spatial models 224, and user models 226 may generally identify patterns in access control event data as mentioned above. These patterns may be used to determine if an alarm should be generated and can include one or more of the following: an access grated event followed by a door forced open event (suppress), a door forced open event followed by an access granted event (suppress), an access denied event followed by a door forced open event (escalate), an access denied event associated with a user not in their home building (escalate), an access denied event associated with a user that is not a full-time employee (escalate), an access denied event that occurs during peak occupancy hours (suppress), a door forced open event followed by a door held open event (escalate), multiple door forced open events or door held open events associated with a door or region (escalate), a door held open event that persists for a long period of time (escalate), a door forced open event in the same building region as a duress event or a glass break event, and a door held open event associated with an external door (escalate). The integration of temporal models 222, spatial models 224, and user models 226 may facilitate dynamic adjustment of various parameters associated with these patterns.

Figure 3A:
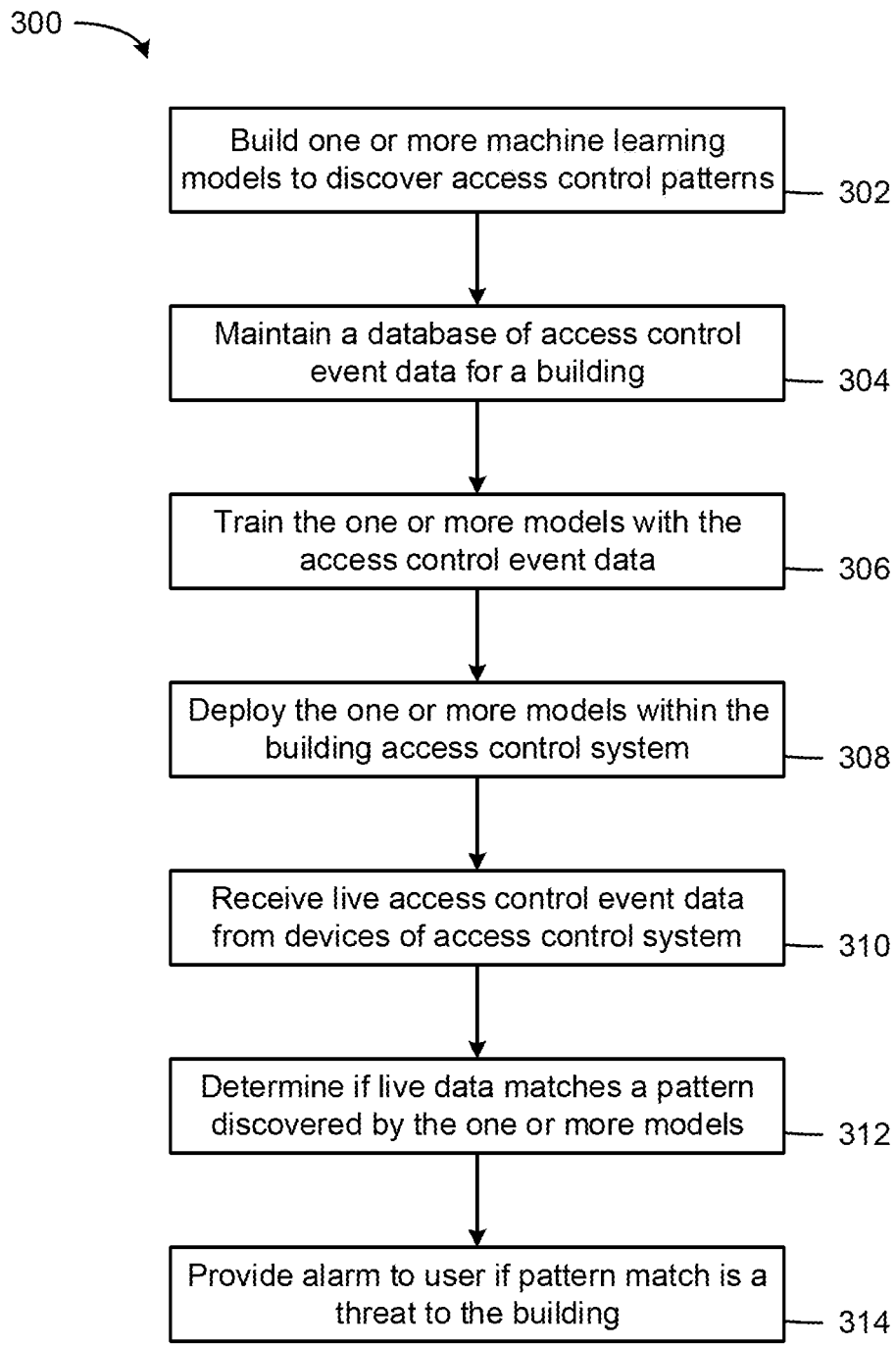
FIG. 3A is a flow diagram of a process for discovering patterns of access control events that indicate potential threats to the building of FIG. 1, according to some embodiments.

Referring now to FIG. 3A, a flow diagram of a process 300 for discovering patterns of access control events is shown, according to some embodiments. Process 300 can be performed by event processing engine 210 of access control system 100, for example. Process 300 can be used to discover insight into the normal operation of access control system 100 as installed in building 10. With this knowledge, process 300 can be used to detect abnormal conditions and patterns that pose a potential threat to the security of building 10. Process 300 can further be used to detect nuisances and suppress such nuisances such that attention of security personnel is not diverted from more significant problems.

Process 300 is shown to include building one or more machine learning models to discover access control patterns (step 302). For example, the models may be temporal models 222, spatial models 224, user models 226 or any combination thereof as described above. Building these models generally involves the steps of ideation, data preparation, prototyping, testing, and product integration. Ideation includes identifying a specific problem as well as the data that may be used to solve the problem. For example, if the problem is excessive door forced open events, a spatial model can be built to learn the behavior of doors that are causing the problem such that nuisance alarms are automatically suppressed. This model may use access control event data from a card reader and/or other access control devices associated with the door to learn such behavior. Continuing with this example, the step of data preparation may generally involve organizing access control event data into a useful format such that the model can effectively digest it. The model may then be prototyped and tested until it produces desirable results. Once the model is ready, it can be integrated into a product such as access control system 100.

Process 300 is also shown to include maintaining a database of access control event data for a building (step 304). For example, the database may be access control event database 230 as described above. The database generally includes access control event data as generated by a plurality of access control devices installed in or around a building. The access control devices may include any of the devices described above such as card readers, keypad readers, biometric readers (e.g., iris recognition, fingerprint readers, facial recognition), motion detectors, fire alarms, burglar alarms, and other types of sensors. Each event in the database may include a variety of associated information such as a timestamp, a device identifier, a user identifier, an event type, and other data fields. In some embodiments, event processing engine 210 is configured to enrich the raw data received from these devices in order to apply useful information such as labels and other metadata. This data enrichment may prepare the access control event data for processing by temporal models 222, spatial models 224, and user models 226, for example. Proper maintenance of the access control event database 230 facilitates efficient and effective processing of access control event data to deliver automation and insight to users of access control system 100.

Process 300 is also shown to include training the one or more models with the access control event data for the building (step 306). For example, temporal models 222, spatial models 224, and user models 226 can be trained with various access control event data stored in database 230. The training process allows these models to learn about typical access control events that occur in a building or building campus. For example, the models may learn that a specific door (e.g., associated with a door identifier) experiences heavy traffic during certain hours of the day and may be held open for extended periods of time because multiple people are using the door. In this example, nuisance door held open events may be generated during these hours of the day because the door does not shut when it is typically expected to. A combination of temporal models 222 and spatial models 224 can automatically detect such nuisance events and suppress them within access control system 100 such that security personal (e.g., SOC 120 operators) are not required to unnecessarily respond to them.

Process 300 is also shown to include deploying the one or more models within the building access control system (step 308) and receiving live access control event data from access control devices installed in the building (step 310). For example, once temporal models 222, spatial models 224, and user models 226 are trained with access control event data maintained in access control event database 230, they can be deployed within access control system 100 such that they facilitate the processing of live access control event data. Event processing engine 210 can query the models (e.g., provide live data as input) in order to evaluate live access control events. For example, if event processing engine 210 receives an access denied event generated by a card reader, event processing engine 210 may provide the access denied event as input to a combination of spatial models 222, user models 224, and temporal models 226. A spatial model may be trained to recognize that the card reader is associated with a door that provides external access to building 10 and the user model may be trained to recognize that a user associated with the ID badge detected by the card reader is not a full-time employee, for example. Process 300 is also shown to include determining if the live access control event data matches a pattern discovered by the one or more models (step 312) and providing an alarm to a user of the access control system if the live data matches a pattern associated with a security threat to the building (step 314). Continuing with the above example, event processing engine 210 may generate an alarm to provide to SOC 120 operators indicating a possible insider security threat to building 10.

Figure 3B:
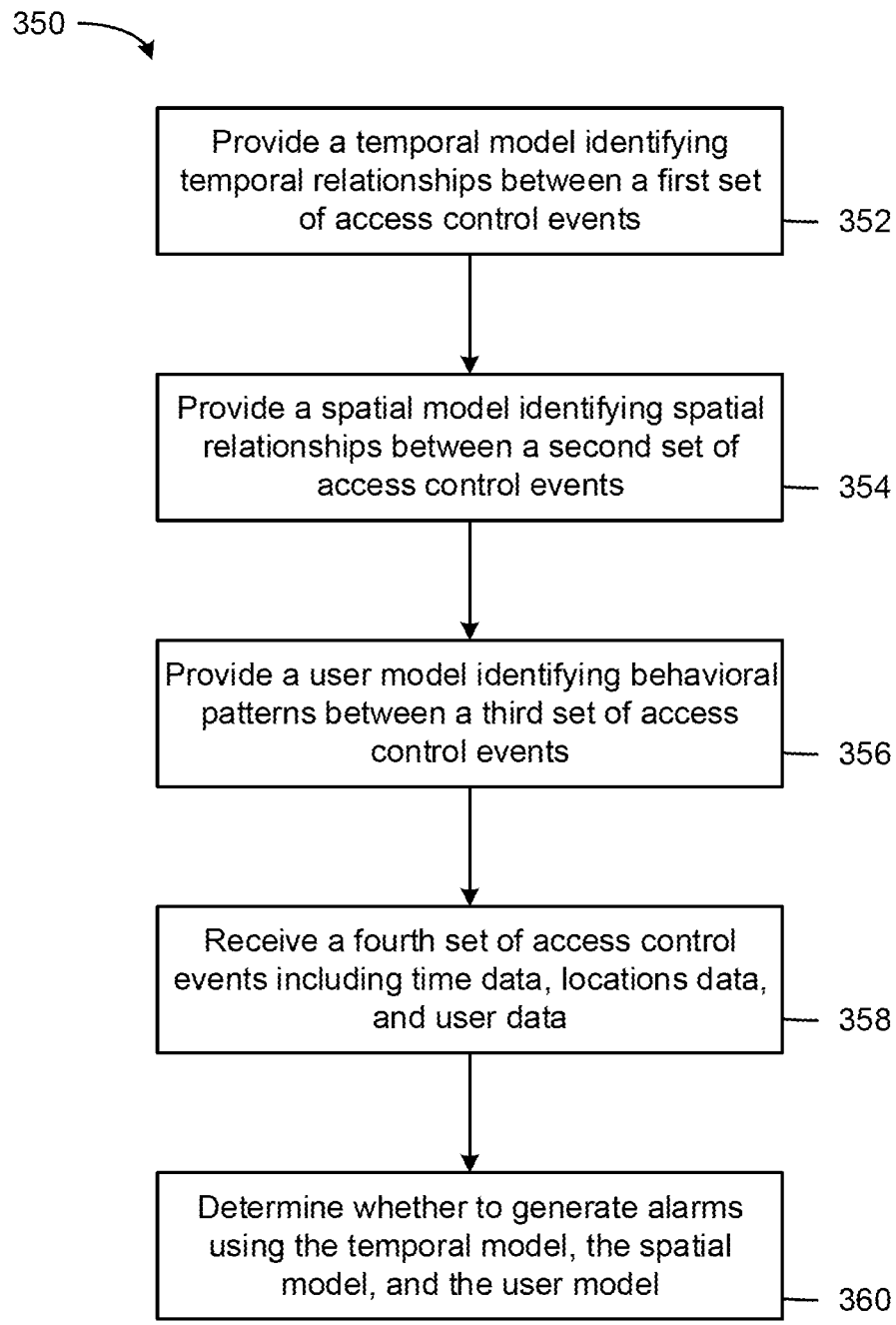
FIG. 3B is a flow diagram of a process for generating alarms in the access control system of FIG. 1, according to some embodiments.

Referring now to FIG. 3B, a flow diagram of a process 350 for generating alarms in an access control system is shown, according to some embodiments. Process 350 can be performed by event processing engine 210 of access control system 100, for example. Process 350 can be used to prioritize certain access control events such that events requiring attention by security personnel are escalated and events that are likely to be a nuisance are suppressed. This functionality allows security personnel to more efficiently address potential threats to building security. This functionality may allow smaller security staffs and reduced costs associated with maintaining building security.

Process 350 is shown to include providing a temporal model identifying relationships between a first set of access control events based on times at which the first set of access control events occurred (step 352). For example, the temporal model may be one of temporal models 222. Process 350 is also shown to include providing a spatial model identifying relationships between a second set of access control events based on locations associated with the second set of access control events (step 354). For example, the spatial model may be one of spatial models 224. Process 350 is further shown to include providing a user model identifying patterns of user behavior based on a third set of access control events (step 356). For example, the user model may be one of user models 226. Process 350 is further shown to include receiving a fourth set of access control events including time data, and location data, and user data associated with the access control events (step 358) and determining whether to generate alarms responsive to receiving the fourth set of access control events using the temporal model, the spatial model, and the user behavior model (step 360). The ability to evaluate access control events using a combination of a temporal model, a spatial model, and a user model facilitates the ability of event processing engine 210 to dynamically analyze and evaluate access control event data. Depending on the application, the decision to generate alarms in step 360 may be based on differently weighted combinations of these different models.

Figure 4:
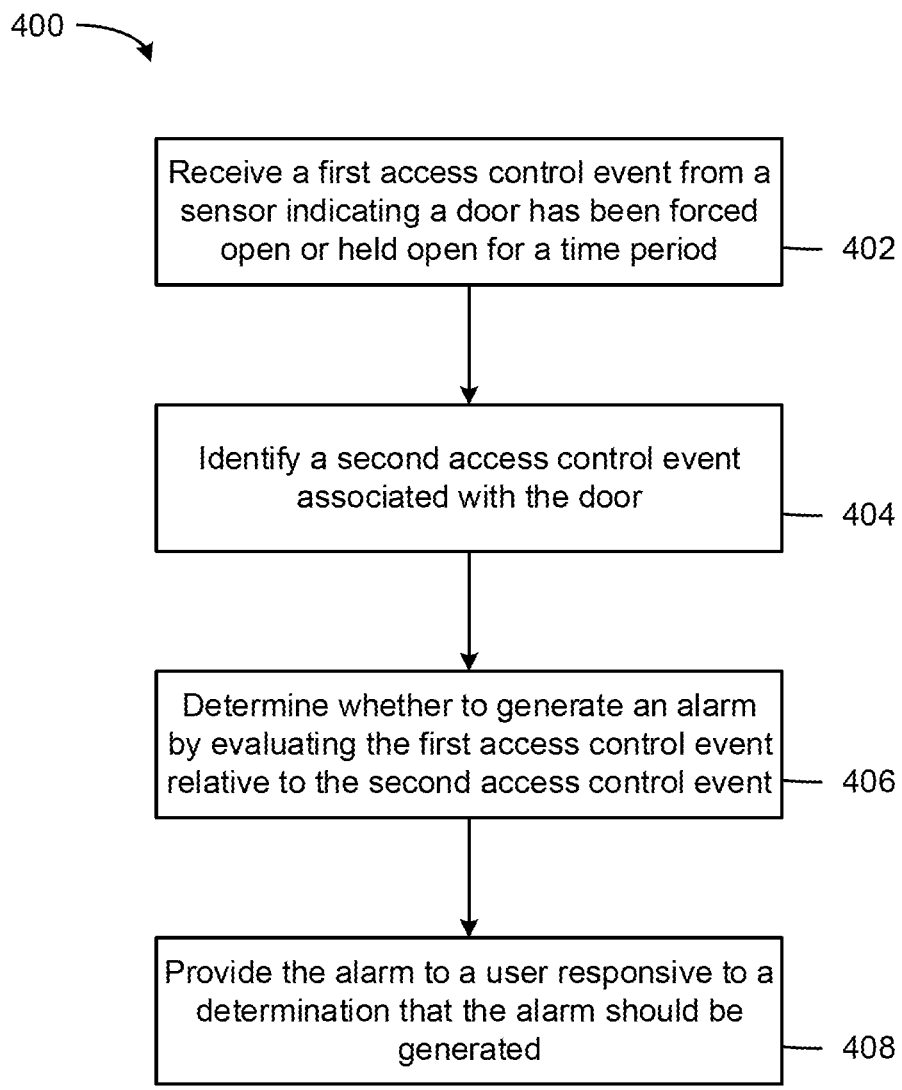
FIG. 4 is a flow diagram of another process for generating alarms in the access control system of FIG. 1, according to some embodiments.

Referring now to FIG. 4, a flow diagram of another process 400 for generating alarms in an access control system is shown, according to some embodiments. Process 400 can be performed by event processing engine 210 of access control system 100, for example. Process 400 can be used to prioritize certain access control events such that events requiring attention by security personnel are escalated and events that are likely to be a nuisance are suppressed. This functionality allows security personnel to more efficiently address potential threats to building security. This functionality may allow smaller security staffs and reduced costs associated with maintaining building security.

Process 400 is shown to include receiving a first access control event from a sensor indicating that a door has been forced open or held open for a period of time (step 402). The first access control event can be generated by any of the access control devices described above with respect to access control system 100 and can be received by event processing engine 210. It will be appreciated that the first access control event may be any of a door held open event, a door forced open event, an access granted event, an access denied event, a glass break event, a fire alarm event, a burglar alarm event, or a duress event. Previous access control systems have analyzed this first access control event on its own without automatically evaluating the event in the context of separate but related access control events within system 100 when determining whether or not to generate an alarm.

Process 400 is also shown to include identifying a second access control event associated with the door (step 404). For example, event processing engine 210 can be configured to query access control event database 230 in order to determine a separate access control event related to the event received in step 402. The second access control event may occur at a time prior to a time associated with the event received in step 402. Event processing engine 210 may be configured to identify the second event within database 230 based on at least one of a timestamp, an event type, a device identifier, and a user identifier. Event processing engine 210 may be configured to identify the second event within database 230 based on labels, metadata, or other information. For example, if the first access control event is a door forced open event, event processing engine 210 may be configured to identify either an access denied or an access granted event that falls within a threshold amount of time before or after the door forced open event associated with the same door (e.g., card reader identifier) as the door forced open event. This functionality may be associated with the patterns and trends discovered by temporal models 222, spatial models 224, and user models 226, for example.

Process 400 is also shown to include determining whether to generate an alarm by evaluating the first access control event relative to the second access control event (step 406). Continuing with the above example, if event processing engine 210 identifies an access granted event in step 404 that occurs shortly before the door forced open event on the same door, then event processing engine 210 may determine that an alarm should not be generated. However, if event processing engine 210 identifies an access denied event in step 404 that occurs shortly before the door forced open event on the same door, then event processing engine 210 may determine that an alarm should generated.

Process 400 is also shown to include providing the alarm to a user of the access control system responsive to a determination that the alarm should be generated (step 408). For example, access control server 122 may be configured to generate and provide a user interface via workstation 124 such that operators of SOC 120 are alerted of the alarm. Access control server 122 may also be configured to generate and provide a user interface via a user device (e.g., smartphone, tablet), initiate a phone call, send an email or text message, or provide a push notification. Additionally, access control server 122 may be configured to initiate an action to be taken by one or more access control devices associated with building 10. For example, access control server 122 may trigger an alarm system such that all occupants of building 10 are alerted of a threat via loud noises and flashing lights.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling access to at least a portion of a building, the method comprising:

providing a temporal model identifying relationships between a first set of access control events based on times at which the first set of access control events occurred;

providing a spatial model identifying relationships between a second set of access control events based on locations associated with the second set of access control events;

providing a user model identifying patterns of user behavior based on a third set of access control events;

receiving a fourth set of access control events comprising time data, and location data, and user data associated with the access control events; and determining whether to generate alarms responsive to receiving the fourth set of access control events using the temporal model, the spatial model, and the user model.

2. The method of claim 1, wherein the plurality of access control events is received from a plurality of access control devices comprising at least one of a card reader, a keypad reader, a biometric reader, a motion detector, or a camera.

3. The method of claim 2, wherein the first, second, and third sets of access control events are received from the plurality of access control devices, such that the temporal model, the spatial model, and the user model are trained on data from the same access control devices from which the access control events are received.

4. The method of claim 1, wherein at least one of the first, second, or third set of access control events comprises a same access control event as at least another of the first, second, or third set of access control events.

5. The method of claim 1, wherein determining whether to generate alarms comprises generating an alarm for a first access control event of the plurality of access control events responsive to any of the temporal model, the spatial model, and the user model indicating an alarm should be raised.

6. The method of claim 1, wherein the temporal model comprises an occupancy model estimating an occupancy level of the at least a portion of the building, and wherein determining whether to generate alarms comprises generating an alarm based on a first access control event of the fourth set of access control events responsive to the temporal model indicating the at least a portion of the building is unoccupied.

7. The method of claim 1, wherein the temporal model comprises an event rate model indicating a time relationship between alert events for one or more access control devices, and wherein determining whether to generate alarms comprises suppressing an alarm based on a first access control event responsive to:

the first access control event being associated with a first access control device of the one or more access control devices; and the event rate model indicating a fault with the first access control device based on a time relationship between alert events for a plurality of access control events of the first set of access control events associated with the first access control device.

8. The method of claim 1, wherein the spatial model comprises a connectivity model indicative of spatial relationships between a plurality of access control devices in the building determined based on time data and location data of the second set of access control events, and wherein determining whether to generate alarms comprises, for a first subset of access control events of the fourth set of access control events, generating an alarm responsive to the connectivity model determining the time data and location data of the first subset of access control events indicates an abnormal pattern of movement.

9. The method of claim 8, wherein the spatial model further comprises floorplan information used to supplement data from the connectivity model.

10. The method of claim 1, wherein the user model comprises an access device type model identifying patterns of behavior in the manner in which access devices of a plurality of access device types are used based on the type of access device, and wherein determining whether to generate alarms comprises, for a first subset of access control events of the fourth set of access control events, generating an alarm responsive to the access device type model indicating a pattern of behavior exhibited by a first access device of a first access device type associated with the first subset of access control events does not match an expected pattern of behavior for the first access device type.

11. The method of claim 10, wherein the first access device type comprises a temporary access device, and wherein the access device type model indicates that the pattern of behavior exhibited by the first access device does not match an expected pattern of behavior for a temporary access device.

12. The method of claim 1, wherein the user model is configured to determine a home building associated with a first user based on the third set of access control events, and wherein determining whether to generate alarms comprises determining to generate an alarm based on a first access control event of the fourth set of access control events responsive to determining the building is not the home building, the first access control event associated with the first user.

13. The method of claim 1, wherein the user model comprises a user-specific model configured to determine a normal pattern of behavior for a particular user based on the third set of access control events, and wherein determining whether to generate alarms comprises determining to generate an alarm based on a first subset of access control events of the fourth set of access control events responsive to the user-specific model indicating a pattern of behavior of the particular user reflected in the first subset of access control events does not match the normal pattern of behavior.

14. A system for controlling access to at least a portion of a building, the system comprising:
one or more processors; and
one or more computer-readable storage media having instructions stored thereon that, when executed by the one or more processors, cause the one or more processors to implement operations comprising:
providing a temporal model identifying relationships between a first set of access control events based on times at which the first set of access control events occurred;
providing a spatial model identifying relationships between a second set of access control events based on locations associated with the second set of access control events;
providing a user model identifying patterns of user behavior based on a third set of access control events;
receiving a fourth set of access control events comprising time data, and location data, and user data associated with the access control events; and
determining whether to generate alarms responsive to receiving the fourth set of access control events using the temporal model, the spatial model, and the user model.

15. The system of claim 14, wherein the plurality of access control events are received from a plurality of access control devices comprising at least one of a card reader, a keypad reader, a biometric reader, a motion detector, or a camera.

16. The system of claim 15, wherein the first, second, and third sets of access control events are received from the plurality of access control devices, such that the temporal model, the spatial model, and the user model are trained on data from the same access control devices from which the access control events are received.

17. The system of claim 14, wherein at least one of the first, second, or third set of access control events comprises a same access control event as at least another of the first, second, or third set of access control events.

18. The system of claim 14, wherein determining whether to generate alarms comprises generating an alarm for a first access control event of the plurality of access control events responsive to any of the temporal model, the spatial model, and the user model indicating an alarm should be raised.

19. The system of claim 14, wherein the temporal model comprises an occupancy model estimating an occupancy level of the at least a portion of the building, and wherein determining whether to generate alarms comprises generating an alarm based on a first access control event of the fourth set of access control events responsive to the temporal model indicating the at least a portion of the building is unoccupied.

20. The system of claim 14, wherein the temporal model comprises an event rate model indicating a time relationship between alert events for one or more access control devices, and wherein determining whether to generate alarms comprises suppressing an alarm based on a first access control event responsive to:
the first access control event being associated with a first access control device of the one or more access control devices; and
the event rate model indicating a fault with the first access control device based on a time relationship between alert events for a plurality of access control events of the first set of access control events associated with the first access control device.

21. The system of claim 14, wherein the spatial model comprises a connectivity model indicative of spatial relationships between a plurality of access control devices in the building determined based on time data and location data of the second set of access control events, and wherein determining whether to generate alarms comprises, for a first subset of access control events of the fourth set of access control events, generating an alarm responsive to the connectivity model determining the time data and location data of the first subset of access control events indicates an abnormal pattern of movement.

22. The system of claim 21, wherein the spatial model further comprises floorplan information used to supplement data from the connectivity model.

23. The system of claim 14, wherein the user model comprises an access device type model identifying patterns of behavior in the manner in which access devices of a plurality of access device types are used based on the type of access device, and wherein determining whether to generate alarms comprises, for a first subset of access control events of the fourth set of access control events, generating an alarm responsive to the access device type model indicating a pattern of behavior exhibited by a first access device of a first access device type associated with the first subset of access control events does not match an expected pattern of behavior for the first access device type.

24. The system of claim 23, wherein the first access device type comprises a temporary access device, and wherein the access device type model indicates that the pattern of behavior exhibited by the first access device does not match an expected pattern of behavior for a temporary access device.

25. The system of claim 14, wherein the user model is configured to determine a home building associated with a first user based on the third set of access control events, and wherein determining whether to generate alarms comprises determining to generate an alarm based on a first access control event of the fourth set of access control events responsive to determining the building is not the home building, the first access control event associated with the first user.

26. The system of claim 14, wherein the user model comprises a user-specific model configured to determine a normal pattern of behavior for a particular user based on the third set of access control events, and wherein determining whether to generate alarms comprises determining to generate an alarm based on a first subset of access control events of the fourth set of access control events responsive to the user-specific model indicating a pattern of behavior of the particular user reflected in the first subset of access control events does not match the normal pattern of behavior.

\* \* \* \* \*